US006616573B2

(12) United States Patent
McLeod et al.

(10) Patent No.: US 6,616,573 B2
(45) Date of Patent: Sep. 9, 2003

(54) METHOD AND APPARATUS FOR ELIMINATING POWER DRAINAGE IN POWER SOURCES USED WITH STARTER-GENERATORS

(75) Inventors: Paul W. McLeod, Martinez, GA (US); John T. Bobbitt, III, Evans, GA (US)

(73) Assignee: Club Car, Inc., Evans, GA (US)

( * ) Notice: Subject to any disclaimer, the term of this patent is extended or adjusted under 35 U.S.C. 154(b) by 0 days.

(21) Appl. No.: 09/960,108

(22) Filed: Sep. 21, 2001

(65) Prior Publication Data

US 2003/0060326 A1 Mar. 27, 2003

(51) Int. Cl.[7] .......................... F16H 59/74; F02N 11/04; H02K 23/52; H02P 9/04

(52) U.S. Cl. .......................... 477/99; 290/32; 290/36 R

(58) Field of Search ................. 477/99, 101; 290/30 R, 290/30 A, 31, 32, 33, 34, 35, 36 R, 37 R, 37 A, 38 R

(56) References Cited

U.S. PATENT DOCUMENTS 3,536,982 A 10/1970 Jackson
3,609,383 A 9/1971 Welsh
3,622,858 A * 11/1971 Mitchell ..................... 320/123
3,763,415 A * 10/1973 Ownby ....................... 320/117
3,973,470 A * 8/1976 Fremlin ...................... 180/304
4,122,354 A 10/1978 Howland
4,161,684 A * 7/1979 Ragaly ........................ 322/90
4,214,198 A * 7/1980 Schneider ................... 320/126
4,590,385 A 5/1986 Hamano et al.
4,721,872 A 1/1988 Simmons
4,945,338 A * 7/1990 Anderson ................... 340/459
5,132,604 A * 7/1992 Shimane et al. .............. 322/10
6,202,615 B1 3/2001 Pels et al.
6,392,311 B2 * 5/2002 Inaba et al. ............... 290/38 R

FOREIGN PATENT DOCUMENTS

DE 4120066 A1 * 1/1992 ........... G01R/19/16

* cited by examiner

*Primary Examiner*—Sherry Estremsky
*Assistant Examiner*—Tisha D. Lewis
(74) *Attorney, Agent, or Firm*—Michael Best & Friedrich LLP

(57) ABSTRACT

A method and apparatus for eliminating inadvertent power drain from an electrical power source coupled to a starter-generator. A multiple-position key switch and bypass rectifier configuration is implemented. The multiple-position key switch is coupled to the power source. The key switch's start terminal is coupled to a solenoid for starting, while a bypass rectifier is coupled in parallel to the solenoid to provide a circuit path for recharging the electrical power source. When either a closed-in-neutral gear shift switch is open or the key switch is in a run/accessory power position, the solenoid is de-energized. This leaves the bypass rectifier as the remaining circuit path through which the power source is recharged. The bypass rectifier allows current flow in a single direction, thereby preventing discharge of the power source.

22 Claims, 5 Drawing Sheets

METHOD AND APPARATUS FOR ELIMINATING POWER DRAINAGE IN POWER SOURCES USED WITH STARTER-GENERATORS

BACKGROUND OF THE INVENTION

The present invention relates to starter-generators. More specifically, the invention relates to a starter-generator circuit that eliminates inadvertent power drainage from a power source.

Starter-generators are used in utility vehicles and equipment having internal combustion engines. Starter-generators are electromagnetic machines that combine the functions of a starter motor and a generator in a single device. A starter-generator is responsible for starting an engine and, once the engine is running, operating as a generator of electrical power. The electrical power is often used to recharge a starting battery and to power devices within or connected to the vehicle or equipment containing the starter-generator. Starter-generators are usually controlled by starter-generator circuits. Often the starter-generator circuit includes a voltage regulator to control the voltage level of generated electrical power.

Starter-generator circuits may also interact with components of the vehicle or device in which they are installed. For example, known utility vehicles are equipped with pedal-actuated-starter-generator circuits, such as the circuit 110 shown in FIG. 1. The circuit 110 includes a ground or ground node 111, a battery 112 with a positive terminal 114, and a two-position key switch 118. The switch 118 includes a ground terminal 120, a magneto terminal 124, a battery terminal 126, and an accessory terminal 128. The switch can be placed in one of two positions—an off/magneto kill position and a run/accessory power position. When in the off/magneto kill position, the switch 118 couples the magneto terminal 124 to the ground terminal 120. When in the run/accessory power position, the switch 118 couples the battery terminal 126 to the accessory terminal 128. In this position, power from the battery may be supplied to accessories (such as lights, a radio, etc. in the vehicle or device) and to a starter-generator (discussed below).

A pedal activated switch 132 is connected to the accessory terminal 128. When the pedal activated switch 132 is closed (such as when a driver steps on an accelerator pedal of a utility vehicle), a coupling is established between the battery terminal 126 and a first inductor coil terminal 140 of a solenoid 142.

The solenoid 142 has a second inductor coil terminal 144 and an open-in-neutral gearshift switch 152 is coupled to the terminal 144. When the open-in-neutral gearshift switch 152 is closed (such as when a driver places a utility vehicle in gear) a coupling is established between the second inductor coil terminal 144 and ground 111. This energizes the solenoid 142 such that a solenoid switch 148 is closed. When closed, the solenoid switch 148 couples the positive terminal 114 of the battery 112 to a node 155. The node 155 is coupled to an inductor 160. The inductor 160 is coupled to a terminal 161 of a starter-generator 162. The starter-generator 162 is coupled to an engine (not shown). When the engine is off, the starter-generator acts as a starter and uses power supplied from the battery to start the engine. Once the engine starts and the engine speed reaches a certain level, the starter-generator acts as generator and generates current that may be used to recharge the battery 112.

The starter-generator 162 is coupled to a transistor terminal 170 of a voltage regulator 172. The voltage regulator 172 is coupled to the node 155 and regulates the voltage applied to the battery 112 by selectively creating a path between the terminal 161 and the ground.

Another example of a starter-generator circuit is a key actuated starter-generator circuit. Like a pedal-actuated-starter-circuit, a key actuated starter-generator circuit has a multi-position switch coupled to a solenoid relay, a voltage regulator, and a starter-generator. However, a key-actuated starter generator circuit lacks a pedal activated switch and may or may not include a gearshift switch.

SUMMARY OF THE INVENTION

The inventors have discovered that a problem with the pedal-actuated-starter-generator circuit 110 and key-actuated starter generator circuits is that so long as the key switch (such as switch 118) remains in the run/accessory power position, accessories can continue to draw power from the battery. In addition, if the engine stalls (in which case the switches 132 and 152 may remain closed in the circuit 110) or operates in such a way that the voltage at the starter-generator is less than the voltage at the positive terminal of the battery, power may be drawn from the battery. In some circumstances it is possible that these demands may deplete the battery. Once depleted, starting the vehicle or device in which the starter-generator is located is impossible until the battery is replaced or recharged with an another mechanism. Accordingly, there is a need for an improved starter-generator circuit such that inadvertent power drainage can be eliminated or reduced.

The invention provides a system for preventing power drain of a battery and utilizes a key actuated starter-generator circuit. The circuit includes a key switch with a plurality of predetermined positions to provide a connection between an electrical power source and a solenoid, and a bypass rectifier to prevent inadvertent drainage of an electrical power source. The solenoid couples the electrical power source to a starter-generator. The circuit also includes a starter-generator to start an engine and to generate power to charge the electrical power source and a voltage regulator to regulate a predetermined voltage applied to the electrical power source. The system may also include a gear-controlled neutrally closed switch to provide a ground for the solenoid.

The inventors also devised a method of starting an engine with a key switch. The method involves turning a key switch to a starting position and energizing a solenoid by an electrical power source. The closing of the solenoid energizes a starter-generator. The method also involves turning the key switch to a running position, and charging the electrical power source by the starter-generator. The method further involves de-energizing the solenoid by moving the key switch to a second predetermined position, or by opening the switched circuit path. The method may further involve keeping a gear in a neutral position. By configuring a rectified circuit path and the solenoid in parallel, and with either the key switched to the second predetermined position or the switched circuit path opened, the electrical power source is recharged by the generator through the rectified circuit path.

Other features and advantages of the invention will become apparent to those skilled in the art upon review of the following detailed description, claims and drawings.

DETAILED DESCRIPTION

Figure 1:
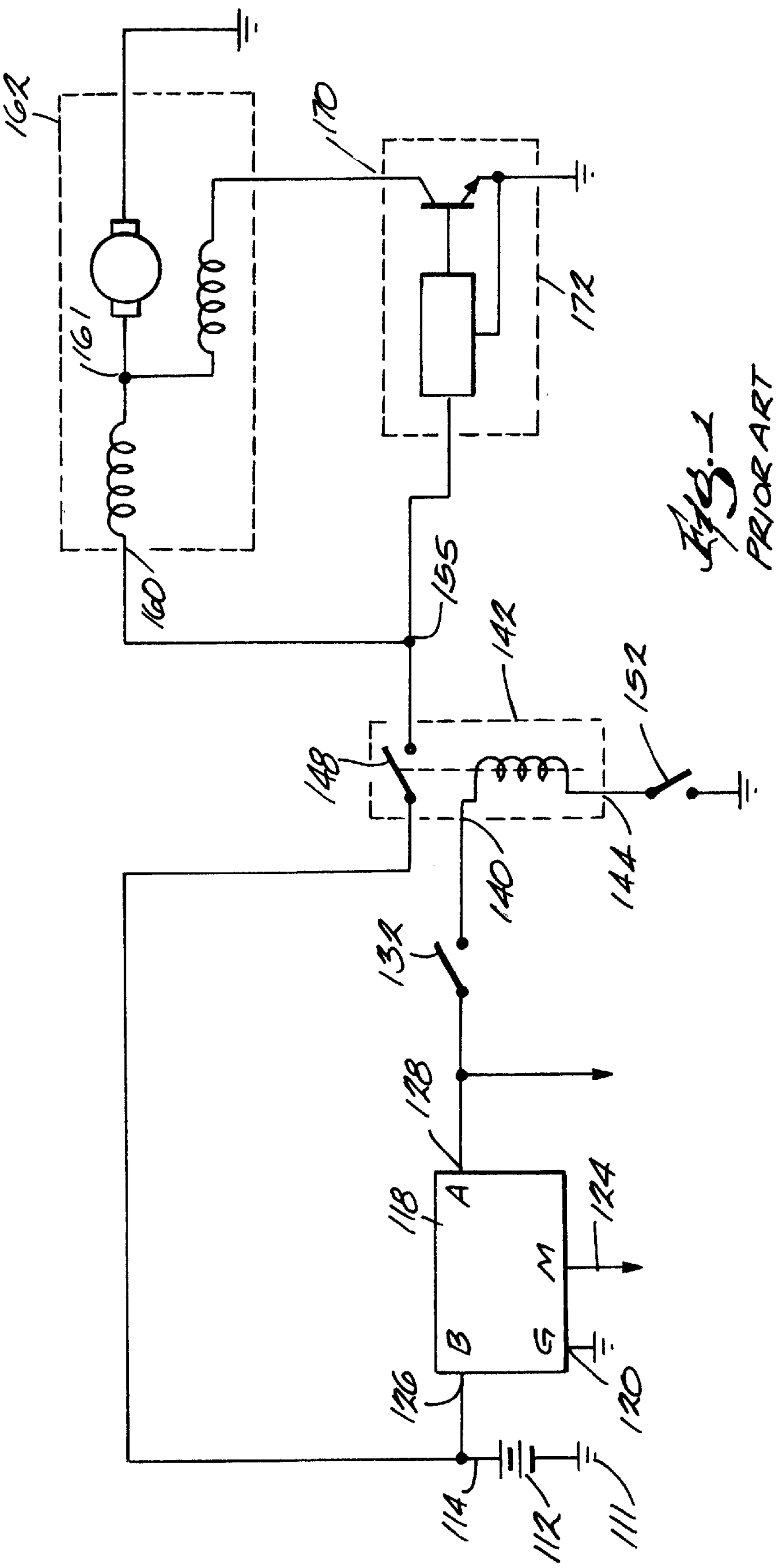
FIG. 1 PRIOR ART
FIG. 1 is a schematic diagram of a prior-art pedal actuated starter-generator circuit.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
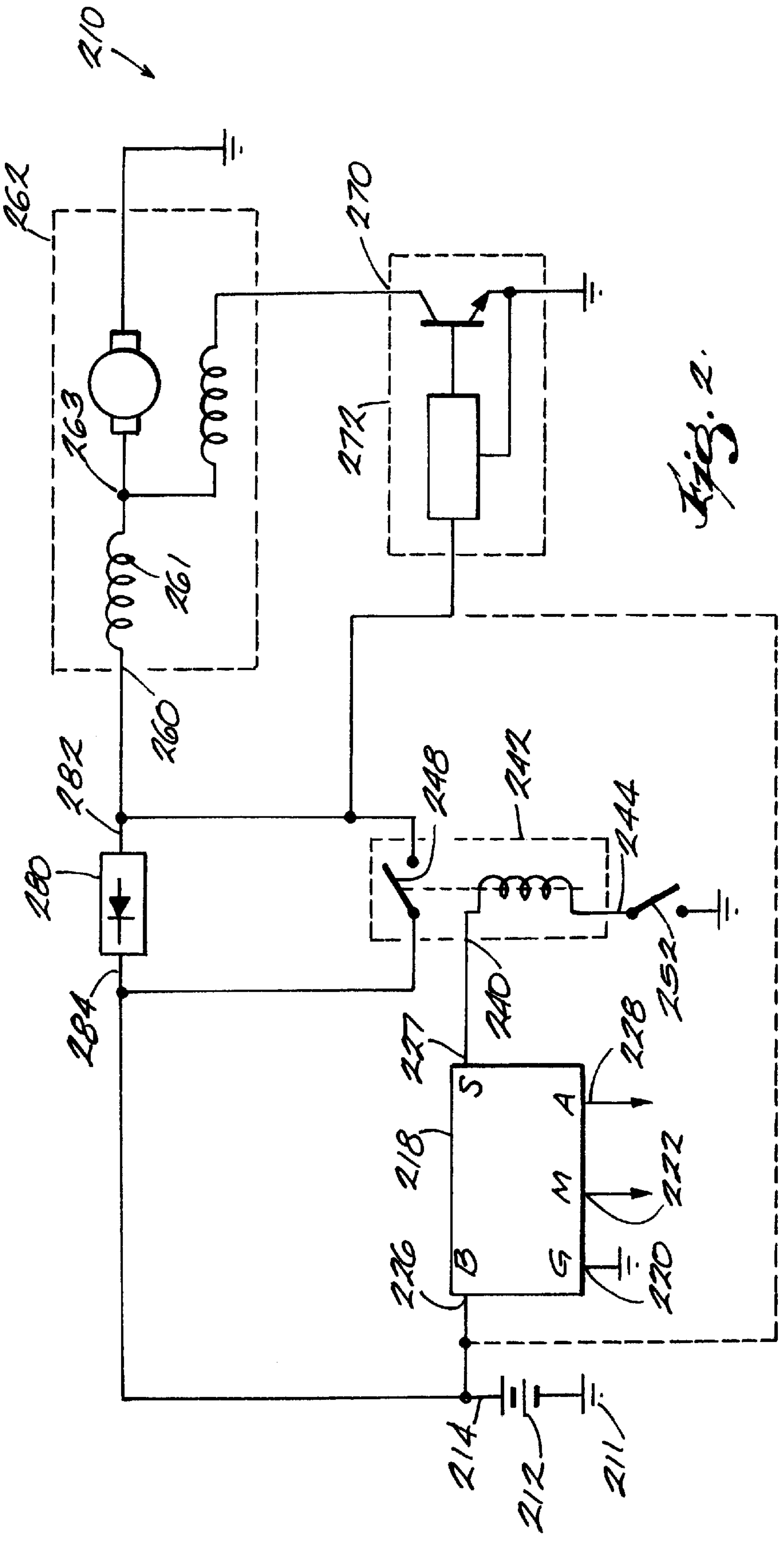
FIG. 2 is a schematic diagram, partially in block form, of a key actuated starter-generator circuit with a bypass rectifier embodying the invention.

FIG. 2 illustrates an improved key actuated starter-generator circuit 210 with bypass rectifier (discussed below). The circuit 210 includes a ground or ground node 211 and a battery 212 having a positive terminal 214. The circuit 210 also includes a three-position key switch 218. The key switch 218 has a ground terminal 220, a kill or magneto terminal 222, a battery terminal 226, a start terminal 227, and an accessory terminal 228. The key switch 218 can be placed in one of three positions an off/magneto kill position (not shown), a start position (not shown), and a run/accessory power position (also not shown). In the off/magneto kill position, the key switch 218 couples the magneto terminal 222 to the ground terminal 220. In the start position, the key switch 218 couples the battery terminal 226 to the start terminal 227. In this position, power from the battery is supplied to a starter-generator (discussed below). In the run/accessory power position, the key switch 218 couples the battery terminal 226 to the accessory terminal 228. In this position, power from the battery 212 may be supplied to accessories (such as lights, a radio, etc. in the vehicle or device). The start terminal 227 is coupled to a first solenoid inductor coil terminal 240 of a solenoid 242. The solenoid 242 also has a second solenoid inductor terminal 244.

The second solenoid inductor terminal 244 is connected to a closed-in-neutral gearshift switch 252. When the closed-in-neutral gear shift switch 252 is closed, (such as when a transmission is in neutral) a coupling is established between the second solenoid inductor coil terminal 244 and ground 211. This energizes the solenoid 242 such that a solenoid switch 248 is closed. This further couples the battery terminal 214 to a first inductor coil terminal 260 of an inductor 261. The inductor 261 is coupled to a starter-generator 262 at a node 263. The starter-generator 262 is coupled to a transistor terminal 270 of a voltage regulator 272, which is coupled to the first inductor coil terminal 260 or the battery terminal 214 (the preferred coupling is shown with a solid line while the alternative connection is shown with a dashed line). The voltage regulator 272 regulates the voltage applied to the battery 212 by selectively creating a path from the node 263 to ground 211.

A bypass rectifier 280 having a positive terminal 282 and a negative terminal 284 is coupled in parallel to the solenoid 242 to provide a circuit path 285 for recharging the battery 212. The rectifier allows current flow in a single direction to the positive terminal of the battery and prevents or reduces current flow from the positive terminal of the battery along path 285. When the closed-in-neutral gear shift switch 252 is open (for example, while the vehicle is in gear and moving), the solenoid 242 is de-energized. This opens the solenoid switch 248, leaving the bypass rectifier 280 as the remaining circuit path through which the battery 212 is recharged. The positive terminal 282 is also coupled to the first inductor coil terminal 262 and the negative terminal 284 is coupled to the positive terminal 214 of the battery 212.

Figure 3:
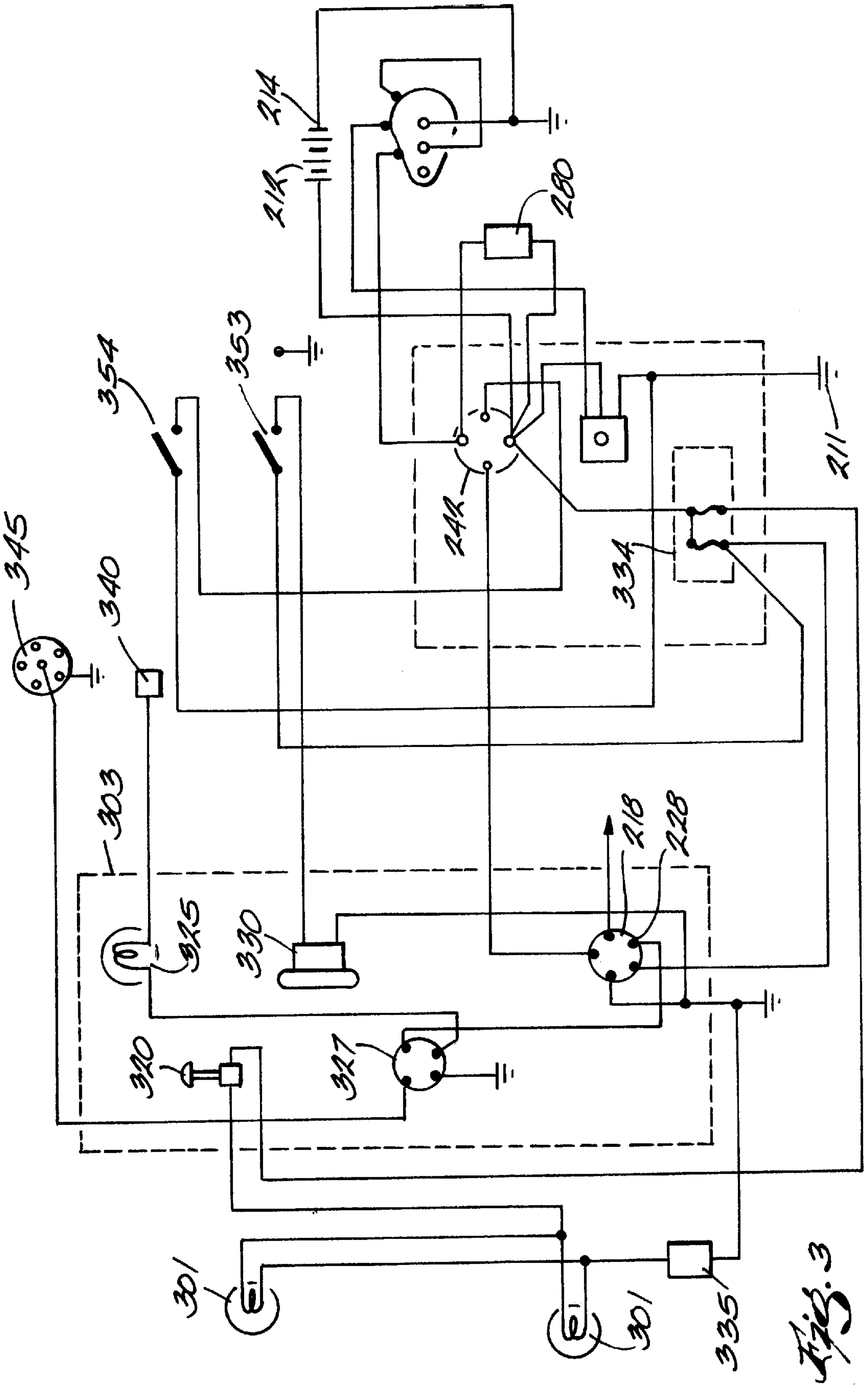
FIG. 3 is a detailed schematic diagram of the key actuated starter-generator circuit with the bypass rectifier shown in FIG. 2, along with electrical system components found in a typical utility vehicle.

FIG. 3 is a detailed schematic diagram of the key actuated starter-generator circuit 210 in conjunction with components commonly found in a utility vehicle (not shown). The components include a left head light 301, a right head light 302, a dashboard 303, and an electrical component box 304. The utility vehicle also includes components such as the battery 212, the bypass rectifier 280, and the starter-generator 262.

The dashboard 303 includes a light switch 320, an oil light 325, a meter gauge 327, a reverse buzzer 330, and the three-position key switch 218. The light switch 320 couples the left head light 301 and the right head light 302 to the positive terminal 214 of the battery 212 through a fuse block 334. The solenoid 242, which is embedded in the electrical component box 304, is coupled to the fuse block 334. The left headlight 301 and the right headlight 302 are also coupled to a second rectifier unit 335, which is coupled to the ground 211. The oil light 305 is coupled to an oil sensing unit 340 and the meter gauge 307. The meter gauge 307 is further coupled to a fuel tank sensing unit 345. The accessory terminal 228 of the three-position key switch 218 is coupled to the meter gauge 307. The reverse buzzer 308 is coupled to a reverse limit switch 353 and the ground 211. A forward limit switch 354 is also coupled to the positive terminal 214 of the battery 212 through the fuse block 334 and the solenoid 242.

As should be apparent, since FIG. 3 simply includes more details of the circuit 210 plus additional well-known components, the operation of the circuit shown in FIG. 3 need not be addressed herein. However, FIG. 3 does illustrate that the closed-in-neutral gearshift 252 can be implemented using the limit switches 353 and 354. In addition, FIG. 3 shows additional details regarding the construction of one preferred embodiment of the bypass rectifier 280. For even further clarity, the preferred embodiment of the rectifier shown in FIG. 3 is reproduced in FIG. 4.

Figure 4:
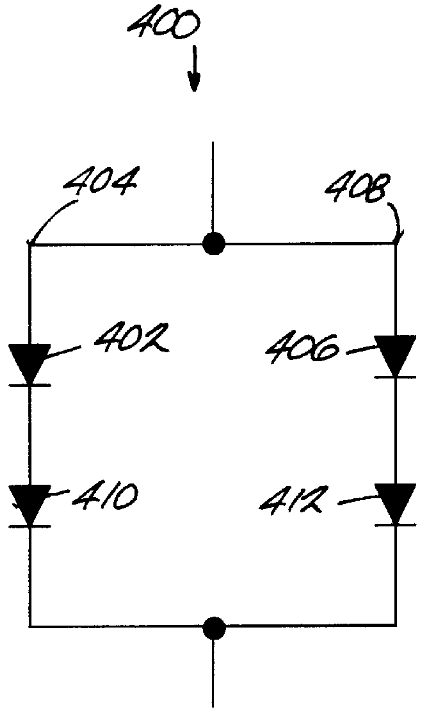
FIG. 4 is a schematic diagram of one preferred embodiment of the bypass rectifier.
Figure 4A:
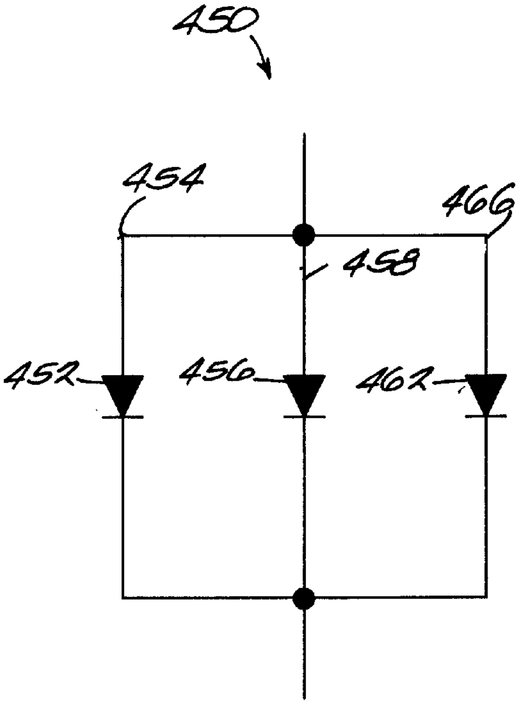
FIG. 4A is a schematic diagram of another preferred embodiment of the bypass rectifier.

FIG. 4 is a schematic diagram of one preferred bypass rectifier 400. The rectifier 400 includes a first diode 402 in a first circuit path 404 and a second diode 406 in a second circuit path 408 that is parallel to the first circuit path 410. The rectifier 400 also includes a third diode 410 coupled in series to the first diode 402 in the first circuit path 404 and a fourth diode 408 coupled in series to the second diode 406 in the second path 408. FIG. 4A is a schematic diagram of another preferred embodiment of the bypass rectifier 450. The rectifier 450 includes a first diode 452 in a first circuit path 454 in parallel to a second diode 456 in a second circuit path 458. The rectifier 450 further includes a third diode 462 in a third circuit path 466. The third diode 462 in the third circuit path 466 is parallel to both the first circuit path 454 and the second circuit path 458.

Although other rectifiers including a single diode or other diode combinations beyond what is shown could be used, the arrangement shown in FIG. 4 has several advantages. Diodes arranged in a series configuration increase the reverse voltage blocking capability of the diode combination. (While the forward current flows remain the same, the reverse breakdown voltage is the maximum of the two individual breakdown voltages.) Further, connecting diodes in parallel increases the current rating of the rectifier. Therefore, connecting diodes-in-series and then in parallel increases both the reverse blocking capability and the current rating. FIG. 4A shows yet another embodiment of three diodes in parallel. This arrangement increases the current rating of the rectifier as described earlier.

Figure 5:
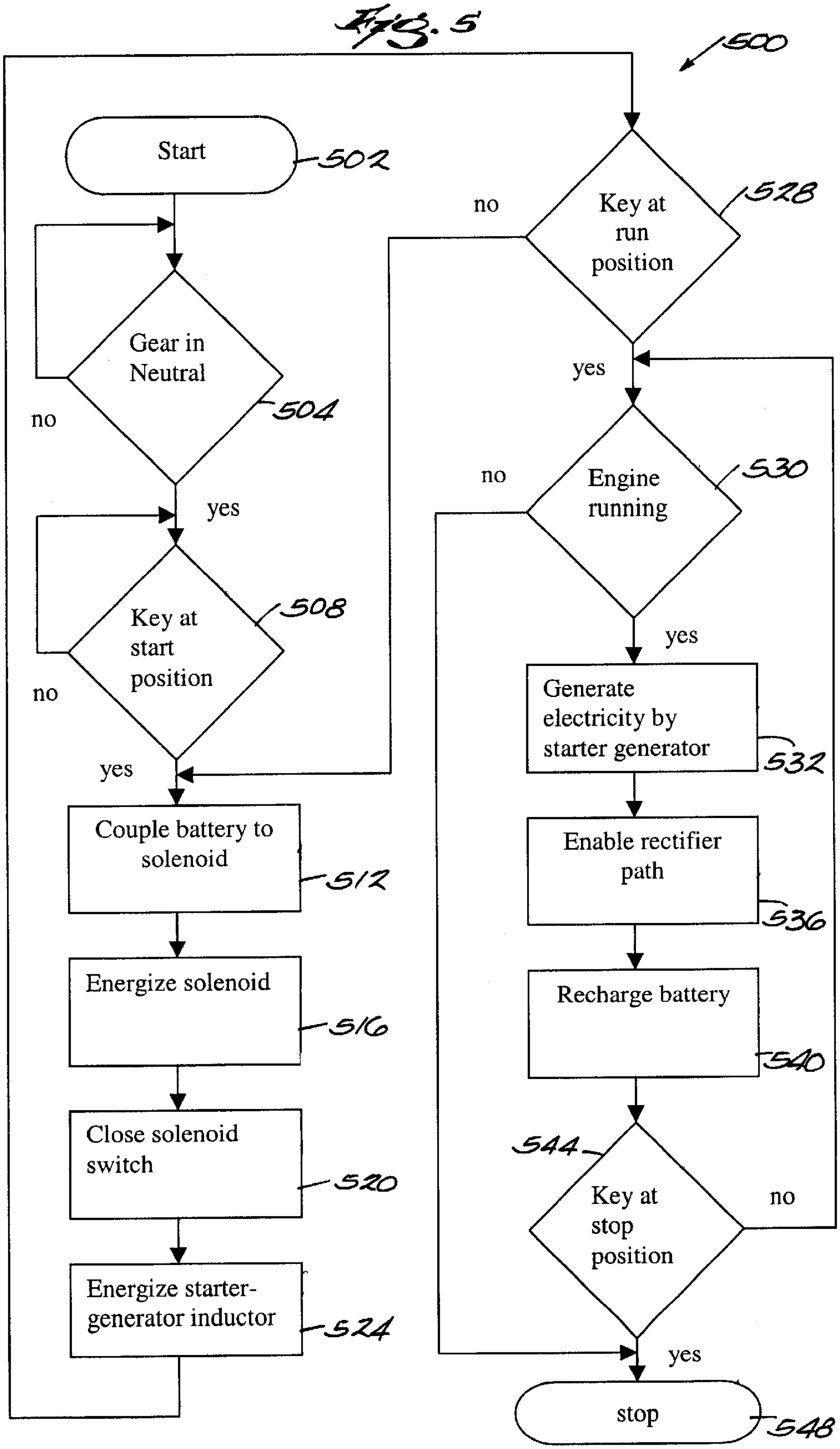
FIG. 5 is a flow chart depicting a method of preventing power drain utilizing a circuit embodying the invention.

A method for preventing power drain of a battery utilizing a control circuit embodying the invention is illustrated in a flow chart 500 shown in FIG. 5. The method begins at a starting step 502. Whether a transmission is in neutral is determined at a first decision 504. If the transmission is not in neutral, no action occurs. Once in neutral, whether the key is at a start position is determined at step 508. (However, it should be noted that the invention may be implemented in devices without gear-controlled switches and step 504 may be eliminated.) If the key is not at a start position, no further action is taken.

If the key is at a start position, the battery is coupled to the solenoid as shown in a coupling step 512. Thereafter, the solenoid is energized by the battery at step 516. The solenoid switch is then closed at step 520. The starter generator inductor is then energized at step 524.

Whether the key is at a run position is determined at step 528. If the key is not at the run position, the circuit continues to apply a start current to the starter-generator. Once the key is in the run position, the engine status is checked at step 530. If the engine is not running, no recharging will take place (step 548). Otherwise, the starter-generator begins to act as a generator at step 532. The rectifier path is then enabled at step 536. The battery is then recharged at step 540. The key position is then checked at step 544. If the key is at a stop position, the engine is shut off and recharging of the battery stops (step 548). Otherwise, the engine continues to run and recharge the battery so long as the battery is not fully charged.

As can be seen from the above, the invention provides a method and apparatus for eliminating inadvertent power drain from a power source used with a starter-generator. Various features and advantages of the invention are set forth in the following claims.

What is claimed is:

1. A key actuated starter-generator circuit comprising:

a key switch with a plurality of predetermined positions to provide a connection between an electrical power source and a solenoid;

a solenoid to provide a connection between the electrical power source and a starter-generator;

a starter-generator to start an engine and to generate power to charge the electrical power source;

a voltage regulator to regulate a predetermined voltage applied to the electrical power source; and a bypass rectifier to prevent inadvertent drainage of the electrical power source when the starter-generator is stalled.

2. A circuit as in claim 1, wherein the key switch includes an input for the electrical power source;

a starter output to provide the electrical power source to the solenoid:

an input for a ground;

an accessory power output; and a kill output.

3. A circuit as in claim 2, further comprising a gear-controlled neutrally closed switch to provide a ground for the solenoid.

4. A key actuated starter-generator circuit comprising:

a key switch with a plurality of predetermined positions to provide a connection between an electrical power source and the solenoid;

a solenoid to provide a connection between the electrical power source and a starter-generator; and a bypass rectifier to prevent inadvertent drainage of the electrical power source when the starter-generator is stalled.

5. A circuit as in claim 4, further comprising a gear-controlled switch to provide a ground for the solenoid.

6. A starter-generator circuit comprising:

a multiple position switch operable to be coupled to a power source;

a relay coupled to the multiple position switch, having a switching element, and operable to be coupled to a starter-generator; and a rectifier coupled in a parallel circuit path to the switching element to prevent inadvertent drainage of the electrical power source when the starter-generator is stalled.

7. A starter-generator circuit as claimed in claim 6, wherein the multiple position switch is a key switch.

8. A starter-generator circuit as claimed in claim 7, wherein the multiple position switch has a start position, a kill position, and an accessory position.

9. A starter-generator circuit as claimed in claim 6, wherein the rectifier is a diode.

10. A starter-generator circuit as claimed in claim 6, wherein the rectifier includes a diode in a first circuit path and a second diode in a second circuit path that is parallel to the first circuit path.

11. A starter-generator circuit as claimed in claim 10, further comprising a third diode coupled in series to the diode in the first circuit path and a fourth diode coupled in series to the diode in the second path.

12. A starter-generator circuit as claimed in claim 6, the rectifier includes a diode in a first circuit path, a second diode in a second circuit path that is parallel to the first circuit path, and a third diode in a third circuit path that is parallel to the second circuit path.

13. A starter-generator circuit as claimed in claim 6, wherein the relay includes a solenoid.

14. A starter-generator circuit as claimed in claim 6, the circuit further comprising a shifter-controlled switch coupled to the relay.

15. A starter-generator system comprising:

a starter-generator;

a voltage regulator coupled to the starter-generator;

a multiple position switch operable to be coupled to a power source;

a relay coupled to the multiple position switch, having a switching element, and operable to be coupled to a starter-generator; and a rectifier coupled in a parallel circuit path to the switching element to prevent inadvertent drainage of the electrical power source when the starter-generator is stalled.

16. A starter-generator system as claimed in claim 15, wherein the multiple position switch is a key switch.

17. A starter-generator system as claimed in claim 16, wherein the key switch has a start position, a kill position, and an accessory position.

18. A starter-generator system as claimed in claim 15, the rectifier is a diode.

19. A starter-generator system as claimed in claim 15, wherein the rectifier includes a diode in a first circuit path and a second diode in a second circuit path that is parallel to the first circuit path.

20. A starter-generator system as claimed in claim 19, further comprising a second diode coupled in series to the diode in the first circuit path and a fourth diode coupled in series to the diode in the second path.

21. A starter-generator system as claimed in claim 15, the rectifier includes a diode in a first circuit path, a second diode in a second circuit path that is parallel to the first circuit path, and a third diode in a third circuit path that is parallel to the second circuit path.

22. A starter-generator system as claimed in claim 15, the system further comprising a shifter-controlled switch coupled to the relay.

* * * * *